United States Patent [19]

Mulvey et al.

[11] 4,351,867

[45] Sep. 28, 1982

[54] THERMAL INSULATION COMPOSITE OF CELLULAR CEMENTITIOUS MATERIAL

[75] Inventors: Robert F. Mulvey, Malvern; Charles E. Crepeau, Centre Square, both of Pa.

[73] Assignee: General Electric Co., Philadelphia, Pa.

[21] Appl. No.: 247,669

[22] Filed: Mar. 26, 1981

[51] Int. Cl.³ .......................... B32B 3/00; B32B 3/26
[52] U.S. Cl. ...................................... 428/70; 428/71; 428/312.4; 428/318.6; 428/703
[58] Field of Search ............. 428/70, 310, 703, 312.4, 428/318.6, 318.8, 307.3, 307.7, 71; 264/42, 45.5, DIG. 14

[56] References Cited

U.S. PATENT DOCUMENTS

| | | | |
|---|---|---|---|
| 3,147,177 | 9/1964 | Owens | 428/703 |
| 3,808,085 | 4/1974 | Givens, Jr. | 428/703 |
| 4,053,677 | 10/1977 | Corao | 428/310 |
| 4,161,855 | 7/1979 | Mulvey et al. | 52/612 |
| 4,240,839 | 12/1980 | Crepeau et al. | 106/88 |
| 4,288,263 | 9/1981 | Delcoigne et al. | 428/703 |

FOREIGN PATENT DOCUMENTS

| | | | |
|---|---|---|---|
| 993779 | 7/1976 | Canada | 428/703 |
| 772581 | 4/1957 | United Kingdom | 428/703 |

*Primary Examiner*—William J. Van Balen
*Attorney, Agent, or Firm*—Raymond H. Quist

[57] ABSTRACT

An improved material particularly suited for the thermal insulation of building structures, such as residential housing, and a process for making the same, are disclosed. The thermally insulating composite comprises a low-density, cellular, fiber-containing, cementitious material and at least one structural surface element made of the cellular, fiber-containing, cementitious material, the structural surface element of which has a higher density than the low-density, cellular, fiber-containing, cementitious material from which it is formed therefrom and integral therewith. The thermally insulating composite is made by placing a foam of the low-density, cementitious material having entrapped gas therein, in an enclosure at least part of which is permeable to the gas and the liquid medium of the foam, and applying pressure to a surface of that enclosure to remove the gas and the liquid medium at the permeable enclosure.

14 Claims, 8 Drawing Figures

THERMAL INSULATION COMPOSITE OF CELLULAR CEMENTITIOUS MATERIAL

BACKGROUND OF THE INVENTION

This invention relates to thermally insulating composite materials, and more particularly, to improved cellular, cementitious materials and a process for making the same.

Inorganic materials such as fiberglass and so-called rock-wool find widespread application for residential housing. In U.S. Pat. No. 4,161,855 and U.S. Pat. No. 4,240,839, improved materials particularly suited for thermal insulation of building structures, such as residential housing, are disclosed. The thermal insulation materials in said patents comprise an inorganic, low-density foam with gypsum as the major constituent. In U.S. Pat. No. 4,161,855, the low-density cellular gypsum material has a dry density in the range of about 3 to about 6 lbs./ft.$^3$, and in U.S. Pat. No. 4,240,839, the low-density cellular gypsum material has a dry density of less than about 3 lbs./ft$^3$.

While the prior art materials exhibit varying degrees of effectiveness as thermal insulators, none of the prior art materials appear to have sufficient rigidity to enable its use without independent structural support.

OBJECTS OF THE INVENTION

Accordingly, it is the primary object of this invention to provide an improved thermal insulation composite and a process for making the same.

It is a further object of this invention to provide an improved thermal insulation composite suitable for the insulation of building structures such as residential housing.

It is another object of this invention to provide improved thermal insulation composite which is substantially inorganic in nature and which has fire retardant and acoustic-deadening characteristics.

It is another object of this invention to provide an improved thermal insulation composite having a skin or higher density outer portion which is integrally a part of a low-density core material and formed therefrom.

It is another object of this invention to provide a process for making a low-density, inorganic, cellular, cementitious thermally insulating material having any desired shape and a higher density outer portion integrally formed from the core material upon any portion of or upon all of the surface.

Still another object of this invention is to provide a process for making an inorganic, cellular, low-density, cementitious thermally insulating material which may be flexible or rigid.

SUMMARY OF THE INVENTION

These and other objects of the invention are accomplished by a thermally insulating composite comprising a low-density, cellular cementitious material having at least one structural surface element or skin with a higher density than the low-density cellular cementitious material from which and upon which it is formed.

In accordance with the present invention, the skin is formed upon a low-density foam with a cementitious material as the major constituent, by placing a slurry of the low-density foam having entrapped gas, in an enclosure at least part of which is permeable to the gas; and applying pressure to a surface of the enclosure to remove gas at the permeable enclosure, thereby increasing the density of the foam adjacent the permeable enclosure. The foam then hardens or cures. Optionally, the permeable enclosure may be removed from the structural surface after formation of the skin.

In this manner, a fast curing, low-density, inorganic, cellular, cementitious material having a skin or layer of higher density, cellular inorganic cementitious material upon one surface or upon a portion of one surface, is realized. The product has significant advantages over prior art thermal insulation materials and is particularly suited for industrial and housing applications.

Further objects of this invention together with additional features and advantages thereof will become apparent from the following detailed description of the preferred embodiments of the invention when read in conjunction with the accompanying drawings.

DETAILED DESCRIPTION OF THE INVENTION

Figure 1:
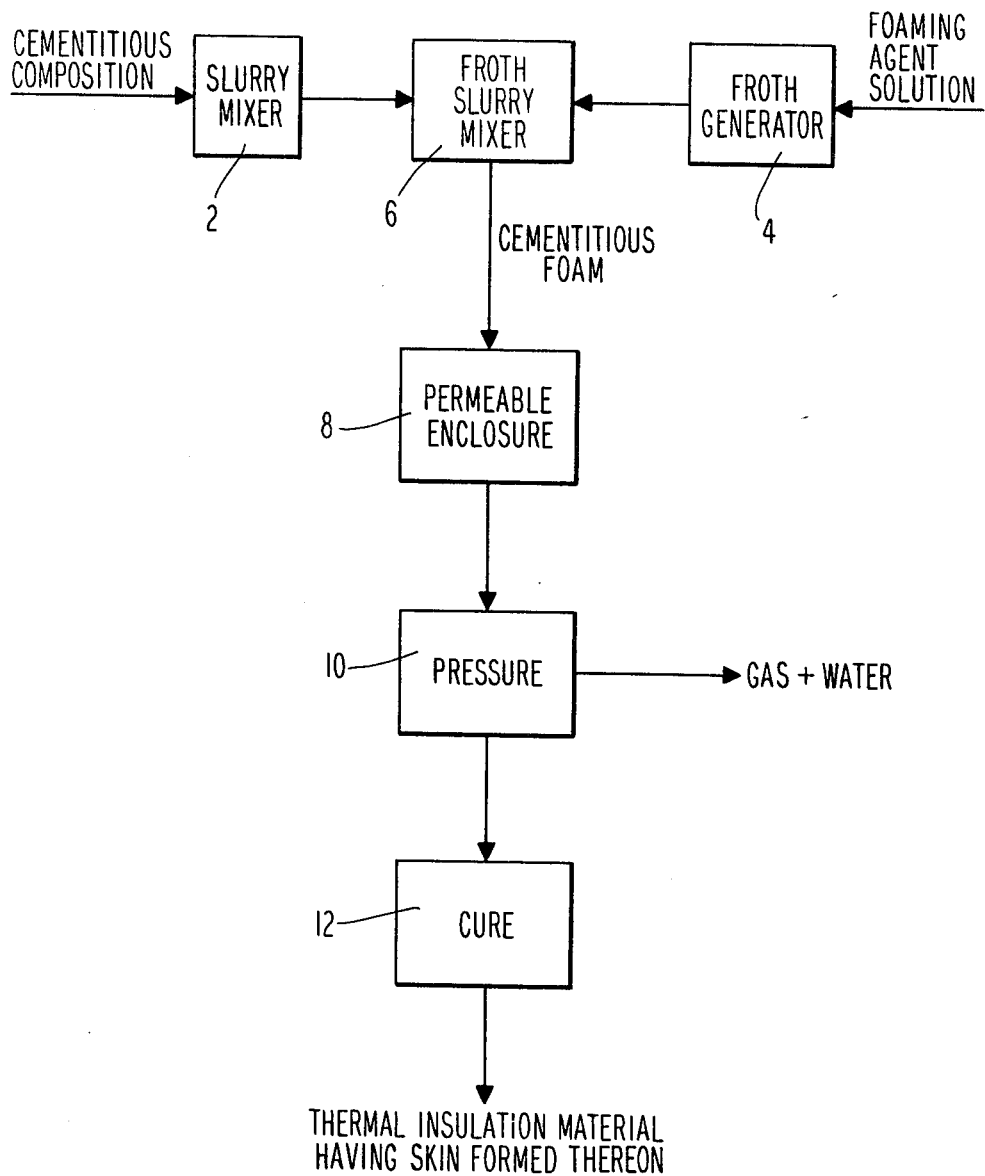
FIG. 1 is a flow diagram of the process for making thermal insulation composite in accordance with the invention.

Referring to FIG. 1, there is shown a simplified flow diagram of the process for producing a composite low-density, fiber-containing, inorganic, cementitious insulation in accordance with the invention. The cementitious foam may be made by any suitable method in the art including the method described and illustrated in U.S. Pat. No. 4,161,855, incorporated herein by reference. U.S. Pat. No. 4,161,855 describes an inorganic, low-density foam with gypsum as the major constituent and having minute cavities homogeneously distributed in the gypsum material, the gypsum material having a dry density in the range of about 3 lbs./ft.$^3$ to about 6 lbs./ft.$^3$. For purposes of convenience, prior art steps 2, 4, and 6 are illustrated in FIG. 1 to illustrate one method for producing a cementitious foam which may be used in accordance with the present invention. Briefly, a cementitious composition is prepared by combining a cementitious material, water, a fibrous material and optionally, other adjuvants and additives, in slurry mixer 2. A foaming agent solution is fed to froth generator 4, and the froth of foaming agent solution from froth generator 4 and the cementitious slurry from slurry mixer 2 are fed to froth slurry mixer 6 to form the wet foam containing entrapped gas used in the invention. Pumps and various other auxillary devices are not shown.

The wet, cementitious, low-density foam having entrapped gas, such as air, from froth slurry mixer 6, is placed in an enclosure at least part of which is permeable to the gas and to the liquid medium, such as water, used to form the foam. The wet, cementitious foam may be pumped, poured, or transferred by any suitable means into permeable enclosure 8. Once the wet, cementitious foam is placed in permeable enclosure 8, pressure sufficient to cause the entrapped gas and the liquid medium from the slurry to pass through the permeable surface of the enclosure, may be applied thereto by any suitable pressure means 10. Suitable means must be provided at the surface of the permeable enclosure to remove the entrapped gas and liquid medium from the portions of the enclosure which are permeable to the gas and the liquid medium. This is generally accomplished by using a porous backup, a grid or a patterned surface adjacent the permeable enclosure. When the gas and/or water is removed from the surface area of the wet foam through the permeable enclosure, the density of that surface area increases and a skin forms adjacent the permeable portions of the enclosure upon the foam, the skin having a higher density than the foam from which it is formed. The compressed cementitious foam material hardens and/or cures about the entrapped gas bubbles to form the low-density thermal insulation material having the skin formed internal with and on the low-density insulation material. Curing step 12 is generally inherent in the cementitious composition, and although no additional steps are required to cure the cementitious foam, in certain cases it may be advantageous to provide conditions, accelerators and/or promoters which accelerate the curing of the cementitious foam.

The wet, cementitious foam is produced by intimately mixing a water-based cementitious slurry, for example, a gypsum or Portland cement slurry, with a water-based froth of a foaming agent, such as sodium lauryl sulfate. The froth provides the small stable bubbles of air, which upon mixing with the wet, cementitious slurry composition, become entrapped thereby. A variety of additives such as accelerators and retarders can be added to the slurry mixture to accelerate curing and to provide other desired features. A typical froth/slurry mixture would have a wet density of greater than about 8.5 lbs./ft.$^3$.

Readily available commercial equipment may be utilized to perform the process steps depicted in FIG. 1. For example, non-woven dacron fiber bags may be used as the permeable enclosure, and any suitable mold may be used to obtain a desired shape or configuration for the thermal insulation product having the skin formed thereon in accordance with the invention. Conventional pressure techniques, for example, a hydraulic press, may be used to apply pressure for the removal of entrapped gas and liquid medium.

Figure 2A:
FIGS. 2a–2d is a series of cross-sectional illustrations which show progressive steps in the formation of a skin upon thermal insulation composite.

Referring to FIG. 2a, a foam 14, of low-density fiber containing inorganic cementitious material having entrapped gas therein, is part of an assembly designated by numeral 15, wherein assembly 15 is comprised of foam 14 within a permeable enclosure 16. Enclosure 16, in preferred embodiments, is a non-woven dacron material in the form of a bag having a neck or opening (not shown) suitable for adding foam 14.

Figure 2B:
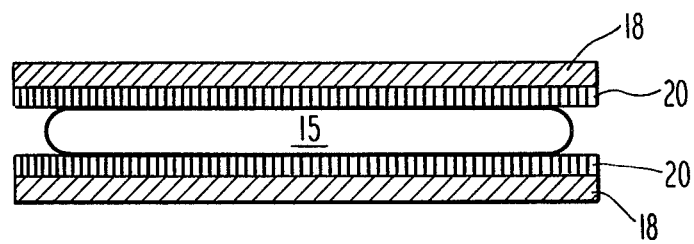

In FIG. 2b, assembly 15 is placed between two press plates 18 having a pair of porous grids 20 interposed between the surface of assembly 15 and press plates 18. In the embodiment shown in FIG. 2b, porous grids 20 are required to provide a region for the removal of the entrapped gas and/or liquid medium from the permeable surface of enclosure 16 when pressure is applied thereto. It is pointed out that any suitable means may be used to convey, dispense or otherwise remove the entrapped gas and/or liquid medium which passes through the permeable enclosure, and to carry the entrapped gas and/or liquid medium away from said surface. In certain embodiments, grids 20 may be a screen, a porous body, a solid plate having a patterned surface, for example, grooves or channels, by which gas and liquids can be removed from the permeable surface.

Figure 2C:
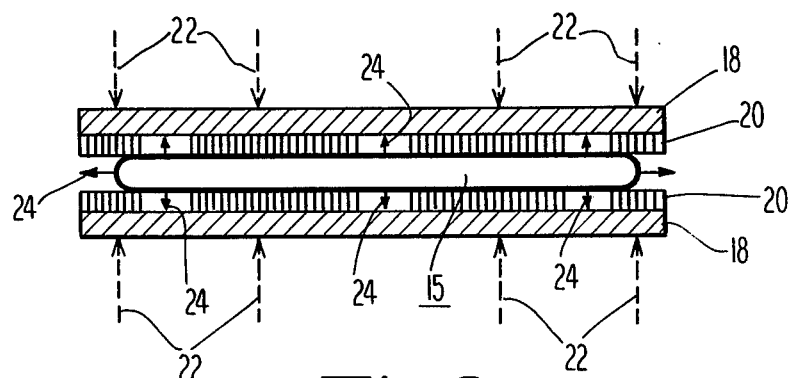

In FIG. 2c, pressure is applied to assembly 15 by press plates 18. The pressure exerted by press plates 18 is illustrated by dotted arrows 22. As pressure is applied to the low-density foam entrapped gas and liquid medium in the foam near the surface of permeable enclosure 16, diffuse through or permeate the non-woven dacron fabric comprising enclosure 16 and pass from the surface of enclosure 16 into grid 20. As the entrapped gas and liquid medium leave the surface of permeable enclosure 16, the density of the cementitious foam adjacent the surface thereof increases. When pressure is applied, the gas bubbles in the foam insulation material close to the permeable portions of the enclosure are driven through the permeable membrane or permeable surface of the enclosure, and the fibers and reacting foam are densified at the enclosure surface. Pressure can be applied for any suitable length of time until the desired thickness of skin is achieved. This can be determined by one skilled in the art by taking into consideration various parameters, such as the initial density of the fiber-containing, cementitious foam, the amount of pressure applied to the enclosure, and the porosity of the enclosure material.

In preferred embodiments, about 0.04 lbs./in.$^2$ to about 20 lbs./in.$^2$ pressure is applied to the surface of the enclosure for about 3 seconds to about 30 minutes to remove gas. In FIG. 2c, the passage of the entrapped gas and liquid into porous grid 20 is shown by small arrows indicated by numeral 24.

Figure 2D:
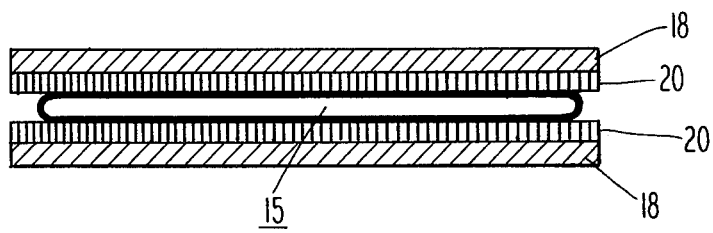

When the porosity of the permeable enclosure is high and/or the applied pressure is high, in certain cases portions of cementitious material may pass through the enclosure material. In FIG. 2d, the pressure upon the foam in permeable enclosure 16 has increased the density of the skin or the outer regions of the cementitious foam to the point where it also provides a filter of sufficient quality that only the liquid medium and air or other gas can pass through. At this point, additional pressure creates a thicker skin without any material loss to the product, i.e., without loss of cementitious material. When the desired thickness of the skin is achieved, and when the thermally insulating composite is sufficiently cured, the pressure can be released, and the thermally insulating composite of a low-density foam and having the skin formed thereon can be removed from the press or other suitable molding device.

Figure 3:
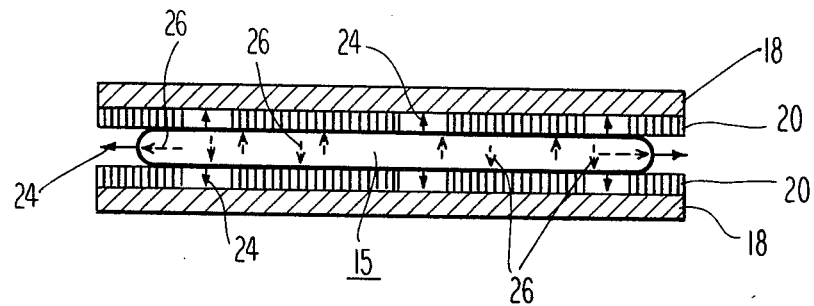
FIG. 3 is a cross-sectional illustration showing an alternative embodiment for applying pressure in the formation of the skin upon thermal insulation composite in accordance with the invention.

In FIG. 3, an alternative embodiment illustrates applying pressure to a surface of the permeable enclosure from within the enclosure. For example, the skin can be formed upon the thermally insulating composite by adding wet, cementitious foam to the permeable enclosure and creating internal pressure therein during and/or after the addition of the foam. Dotted arrows 26 illustrate the internal application of pressure upon the surfaces of the permeable enclosure, and arrows 24 illustrate the direction of flow of the entrapped gas and the liquid medium from the foam into porous grids 20. In this embodiment press plates 18 can merely be fixed or backup plates. Naturally, it is within the purview of one skilled in the art to use a combination of external pressure and internal pressure to form the skin upon the thermally insulating composite in accordance with the present invention.

Figure 4:
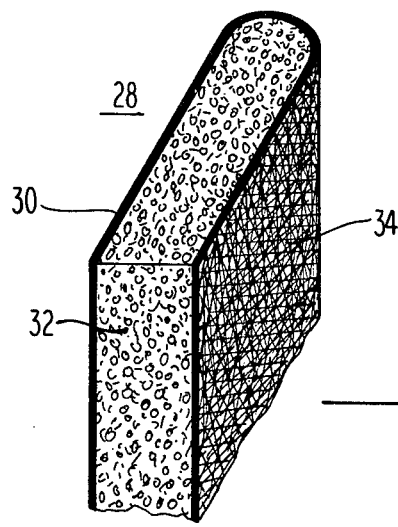
FIG. 4 is a three-dimensional, cut-away view showing a typical structural section employing the thermal insulation of the invention.

In FIG. 4, a three-dimensional cut-away structural wall section 28 employing the thermally insulating composite of a low-density foam with a cementitious material as the major constituent and with a fiber-containing material as a minor constituent, has a structural surface element (skin) 30 integrally connected to and formed from low-density, cellular, cementitious material 32 which contains fibrous material. In thermally insulating composite 28, a permeable enclosure element 34 remains upon skin 30 of the composite. In other embodiments (not shown) permeable enclosure element 34 can be removed from the higher density structural surface 32. In thermally insulating composite 28 of FIG. 4, a plurality of structural surface elements 30 of the higher density, cellular, cementitious material containing fibrous material, define a core of low-density, cellular, cementitious material 32. In certain other embodiments (not shown), only one surface or only a portion of a surface may have skin 30 formed thereon, depending upon the extent of the permeable enclosure element 34.

Figure 5:
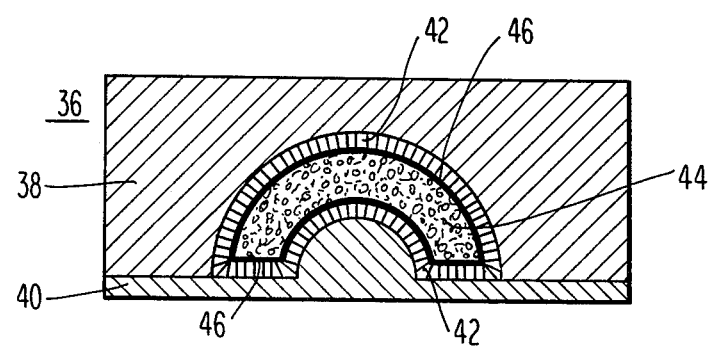
FIG. 5 is a cross-sectional view of a mold illustrating the formation of a thermally insulating composite pipe made in accordance with the invention.

The thermally insulating composite of the present invention may be cast, molded or otherwise formed into any desired shape and/or pattern. The product may be in the form of a flat plate or a board as shown in FIG. 4, or, as shown in FIG. 5, a section of pipe insulation can be formed in a product mold. FIG. 5 shows the cross-section of a mold 36 which can be used to produce, for example, a pipe-type of insulation. Mold 36 contains a solid steel plate 38 and a steel plate 40 having the desired configurations. Porous grids 42 are used to line the mold in the areas where skin formation is desired to be formed upon the final composite. A permeable enclosure (not shown) is used to conform to the shape of the mold and to allow the passage of entrapped air and liquid medium from a foam 44 of low-density, cellular, cementitious material having entrapped gas therein. Low-density, cellular, cementitious foam 44 is placed in the mold, and pressure is applied thereto. The entrapped gas and liquid medium pass from the foam at the surfaces adjacent the permeable enclosure into porous grids 42. A high-density skin or structural surface element 46 forms upon the surface of the low-density, cellular, cementitious material, said skin or structural surface element 46 being formed from and integral with the low-density, cellular, cementitious material. The cementitious material cures, and the cured composite can be removed from the mold. Almost any conventional mold can be used as long as the porous grid, for example, a fine-wire mesh or plastic screen element, can be used in the mold to collect the entrapped air and liquid medium from the foam, and as long as a sufficient amount of pressure can be applied to the low-density cellular, cementitious material to form the skin thereon. For example, a mold to form a block-type product can be formed so that the product has an insulating non-load bearing wall, or a mold can be used which would have ribs upon the surface to produce added stiffness in the length of the product. It is within the purview of one skilled in the art to utilize and adapt any type of conventional mold elements in the formation of the thermally insulating composites of the present invention into the desired shape. The mold into which the wet foam is cast may take a variety of forms. In its most simple form this may involve no more than pouring the wet foam of slurry onto a casting table having suitable restraining dams, means for applying pressure and means for removing gas and/or liquid which passes from the wet foam of cementitious material through a permeable enclosure used as a liner on the casting table. It may be desirable to vibrate the mold to ensure proper filling of the mold, and to apply other common techniques normally used in the molding of insulating material.

As explained above, in the present invention, a permeable enclosure element or membrane 34 may be used, which may become an integral part of the wall of the composite, or alternatively, which may be removed after the formation of the skin or layer of higher density upon the low-density cementitious material. Thus, when a mold is used in accordance with the invention as discussed above, a permeable enclosure element must be used in conjunction with the mold. In certain instances, the mold, when it is permeable to entrapped gas and/or fluid medium from the wet foam, may be the permeable enclosure, however, in most preferred embodiments of the invention, the permeable enclosure element is an element separate from the mold.

The permeable enclosure can be made of any material which permits the entrapped gas and/or fluid medium from the wet foam to pass therethrough under pressure. The permeable enclosure element may be a woven or non-woven synthetic or natural fabric or blend thereof, a permeable metal or plastic, a wire screen and the like. The permeable enclosure may be permeable at all surfaces, or one surface, or at a portion of all surfaces or a portion of one surface. In most preferred embodiments, the permeable enclosure element can have a pore size of from less than about 40 mesh to about 100 mesh. In one preferred embodiment, the permeable enclosure is a non-woven dacron fiber product, manufactured by E. I. Dupont de Nemours and Co. and designated by the trademark, REEMAY. The non-woven dacron fiber product may be formed into a bag or other desired shape, filled with the wet foam subjected to pressure sufficient to remove some of the gas and some of the liquid medium from the wet foam adjacent the non-woven dacron fiber bag to form the skin or higher density cementitious surface. As indicated above, this permeable bag may be removed from the composite after the desired amount of gas and the desired amount of liquid have been removed through the pores of the bag by the application of pressure. As used herein, "permeable enclosure" is used to designate the enclosure in those cases where only a portion of the enclosure is permeable and in those cases where all of the enclosure is permeable. Although the amount of pressure is not critical in the practice of the present invention, it is necessary to apply pressure to at least one surface of the enclosure to remove gas and liquid medium through the surface thereof to form the skin.

In the present invention, the gas and/or liquid which passes from the foam of cementitious material through the permeable enclosure, must be removed from the surface of the permeable enclosure or conveyed therefrom by any suitable means. Thus, means for removing gas and/or liquid which passes from the wet foam material through the permeable enclosure must be provided in a mold, pressure device or any other device used to form or shape the thermally insulating composite, and any press plate, retainer member or other member juxtaposed against a permeable portion of the permeable enclosure, must be capable of removing the gas and/or liquid. This is generally accomplished by providing a porous grid, screen or any other element which can remove the gas and/or liquid emanating from the surface of the permeable enclosure element. The gas and/or fluid which passes through the permeable enclosure element, may also be removed by providing suitable patterned surfaces, for example, grooves or channels, in the mold adjacent the permeable enclosure. The porous grid or other means for removing gas and/or liquid, must be positioned adjacent any area of the permeable enclosure through which the gas and/or liquid medium is removed.

The raw materials, that is, the composition which forms the wet foam containing entrapped gas utilized in the practice of the invention, are readily available in most areas of the world. The strength of the thermally insulating composite of the invention is provided by a cementitious material, such as hydraulic cement or gypsum cement which hardens on the surface of the froth bubbles (entrapped gas, such as air), to form a low-density, cellular structure. Hydraulic cements are mixtures of fine-ground lime, alumina and silica that will set to a hard product by an admixture of water, which combines chemically with the other ingredients to form a hydrate. Portland cement is a type of hydraulic cement in the form of finely divided gray powder composed of lime, alumina, silica and iron oxide as tetracalcium aluminoferrate, tricalcium aluminate, tricalcium silicate and dicalcium silicate. Small amounts of other elements are also present. Sand is often added as a diluent, and the cement may be modified with various materials, such as plastic lattices.

Gypsum cement is found as a natural rock deposit in most parts of the world. In the natural state gypsum purity ranges from about 80% to about 99%, and natural gypsum is basically calcium sulfate with two waters of hydration. The heating of the gypsum to roughly 400° F., that is, calcining, removes all but one-half of the two waters of hydration providing a product designated as hemihydrate gypsum which is the form that is normally used for making all plaster products. This form is also available as a synthetic by-product of the fertilizer industry. The impurities and neutralization effects are described in U.S. Pat. No. 4,161,855. Although two cementitious materials have been described, any cementitious material or mixtures thereof in which air or other gas can be entrapped to form a foam, may be used in the invention.

The wet foam of low-density, cementitious material containing entrapped air, may be prepared as described in FIG. 1 above and as explained in U.S. Pat. No. 4,161,855, or it may be prepared by any suitable means available in the art. The foam of cementitious material is preferably a water-based slurry, but can be a combination of water and other liquid media.

Although the gas which forms the cellular structure of the cured composite and which is entrapped within the slurry or froth/slurry composition is usually air, any other suitable gas or mixture of gases may also be used in the present invention including nitrogen and other inert gases.

The various cementitious materials, for example, Portland cement, gypsum cement, and the like, have a variety of different cure rates, and accelerator/retarder systems may be used therein and may be tailored to the particular material being used. Even various gypsums have a variety of different cure rates, and the accelerator/retarder system must be tailored to the particular gypsum cement being used. Through the use of known accelerators, such as alum, or known retarders, such as sodium citrate, or in some instances a combination thereof, nearly any dihydrate gypsum material can be used to produce the foam of the invention. Generally, the curing is inherent for the particular cementitious material, and curing takes place upon standing, however, various techniques may be applied to promote or accelerate and/or to retard the curing of the cementitious material to form the thermally insulating composite of a low-density foam having a higher density skin in accordance with the present invention.

Although the cementitious materials of the invention are not limited to any particular density, in accordance with the present invention, the skin or outer surface of the thermally insulating composite has a higher density than the inner portions or core of the thermally insulating composite. Because of the method of making the thermally insulating composite, the composite comprises a low-density, fiber-containing, cellular, cementitious element and a higher density, fiber-containing, cellular, cementitious surface element integrally formed upon at least part of the low-density, cellular, cementitious element. Generally, the dry density of the low-density, cellular cementitious material containing fibrous material is greater than about 6 lbs./ft.$^3$. In preferred embodiments, the dry density of the low-density, cellular cementitious material containing fibrous material is between about 6 lbs./ft.$^3$ and about 35 lbs./ft.$^3$. The wet density of the wet foam of cementitious material is not critical. However, in preferred embodiments, the wet density generally ranges from 1.3 to about 2 times the dry density of the cellular, cementitious thermal insulation material.

The area or region of the thermally insulating composite adjacent the permeable enclosure where entrapped gas and liquid medium has been removed from the wet foam, thereby increasing the density of the cementitious material as the permeable enclosure, is described herein as the skin of the thermally insulating composite. The removal of the entrapped gas compresses the wet foam at the surface area and thereby increases the density of the material at that point. The differential in density between the low-density, cementitious material and the high-density cementitious material is not critical, however, in most embodiments, the differential in density is between about 15 lbs./ft.$^3$ and about 120 lbs./ft.$^3$, the higher density being the skin and the lower density being the core or inner portions of the thermally insulating composite. Generally, in preferred embodiments, the dry density of the structural surface element (skin) is about 50 lbs./ft.$^3$ to about 120 lbs./ft.$^3$.

The thermally insulating composite of the present invention also contains therein a minor constituent of fibrous material or fiber-containing material. Thus, the gypsum cementitious foam, the hydraulic cementitious foam, such as Portland cement foam, and the like, not only contain entrapped gas or air, but they also contain a fibrous material. The fibrous material may be either inorganic or organic, such as fiberglass, mineral wool or cellulose fibers obtained from paper. Since the skin is formed from the low-density cementitious foam of the core, both the skin and the core contain the fibrous material. In preferred embodiments, the cementitious material contains about 0.25 weight percent to about 7.0 weight percent fiberglass based upon the weight of the cementitious material. In one embodiment 4% by weight of fiberglass having a length of 6.4 mm. was used with gypsum cement in a REEMAY bag having a pore size of 100 mesh and was pressed at 2 lbs./in.$^2$ for 2 minutes to form a skin on the surface of the cementitious foam. Depending upon the end use of the thermal insulation material, the amount of cellulose fiber may range from ½% to as high as 30% by weight (based upon the weight of the cement portion of the cementitious material) and more typically 16% by weight. The length and size of the fibers may vary in the same composition in the practice of the present invention, however, fibers are preferably from about 1.2 mm. to about 5.0 mm. in length. In certain preferred embodiments the cellulose fibers have a length to diameter ratio of greater than 30:1, and length may be about 7.0 mm. to about 0.2 mm. or smaller. The fibrous material is generally incorporated onto the formulation to provide increased resistance to vibration and to increase the strength of the low-density cementitious composite material.

Various additives can also be used to minimize the weakening of the cementitious material in the event the thermally insulating composite is subjected to moisture or exposed to water. Coating agents for the cementitious material, such as emulsified tar and asphalt and emulsified polymers such as polyvinyl chloride, polyvinyl acetate, acrylics and other inexpensive water compatible polymers, may be utilized in the formulations. Reactive systems, such as urea and melamine formaldehyde may also be utilized. Other adjuvants and agents, such as those disclosed in U.S. Pat. No. 4,161,855, may be also used in the composition of the present invention.

As previously pointed out, the low-density, inorganic foam thermally insulating composite of the invention finds particular application as thermal insulation in building structures, such as residential housing. Improved thermal, fire retardant and smoke emission characteristics are realized from the composite of the invention at a reduced cost compared to conventional materials. The composite of the invention is particularly suited for industrialized construction and is formed from raw materials readily available in most areas of the world. The thermally insulating composite of the invention may also be used as clapboard, in homosote type applications, in ceiling tiles and as wall board because of the skin which is integrally formed upon the surface of the composite and because of the varying densities which are attainable. The thermally insulating composite of the invention can be made lighter than wall board, yet have the same strength because of increased strength of the skin or outer layer. Thus, the material is less expensive than the prior art materials having the same strength. Furthermore, the thermally insulating composite does not need paper or other surface coatings to hold the composite together, thereby reducing material and manufacturing costs. By selectively increasing the porosity of the permeable enclosure, the thickness of the skin can be selectively increased for decorative purposes, or the strength of the material can be selectively increased, or the handling characteristics of the product can be improved.

Thermally insulating composites of a low-density foam with a cementitious material as the major constituent and having a skin formed thereon from the low-density foam similar to the thermally insulating composite illustrated in FIG. 4 were made by providing a gypsum cementitious foam material similar to that described in U.S. Pat. No. 4,161,855 and incorporating various fibrous materials. A wet foam material containing entrapped air, and 5% by weight glass fiber, based upon the weight of the gypsum cement, was placed in a bag made of a non-woven dacron fiber product supplied by E. I. Dupont de Nemours and Co. under the trademark REEMAY. The various samples of gypsum material formed by the pressure techniques previously described had skins ranging from about 20 mils to about 25 mils. Naturally, almost any thickness of skin can be provided depending upon the porosity of the bag enclosure, the pressure applied, the length of time the pressure is applied, and the amount of fibrous material in the composition. As the amount of fibrous material, e.g., fiberglass, is increased in the composition, the skin thickness decreases due to the mating of the fibers resulting in a blocking of the flow of entrapped gas and liquid from the wet foam.

Higher or lower pressures can also be used depending upon the rate of skin development desired and the initial permeability of the membrane. As the amount of pressure, length of time pressure is applied and/or porosity of the permeable enclosure increases, the skin thickness increases.

Other samples were prepared using cellulose fibers obtained from paper and fibers of mineral wool. All of these materials worked effectively in the product. Boards of thermally insulating composites made with a combination of fiberglass and cellulose fibers produced a resilient product having a skin of higher density than the density of the core material.

When fiberglass was used in the foregoing examples, 4.3 parts of fiberglass were used per 100 parts of gypsum having a glass fiber length of ⅛ inch; 3.4 parts of fiberglass per 100 parts gypsum having a glass fiber length of ¼ inch were used; and 2.8 parts fiberglass per 100 parts gypsum having a glass fiber length of ½ inch were used.

While the present invention has been described in detail with particular reference to certain preferred embodiments thereof, it will be understood that variations and modifications can be affected within the spirit and scope of the invention.

What we claim and desire to secure by Letters Patent of the United States is:

1. A thermally insulating composite comprising:
   (a) a low-density cellular cementitious material containing fibrous material; and
   (b) at least one structural surface element of cellular cementitious material formed from, integrally with, and upon at least part of the low-density material, the structural surface element containing fibrous material and having a higher density than the low-density material.

2. The thermally insulating composite of claim 1 wherein the dry density of the low-density cellular cementitious material containing fibrous material is greater than about 6 lbs./ft.$^3$.

3. The thermally insulating composite of claim 1 wherein the dry density of the low-density cellular cementitious material containing fibrous material is about 6 lbs./ft.$^3$ to about 35 lbs./ft.$^3$.

4. The thermally insulating composite of claim 1 wherein the dry density of the structural surface element is about 50 lbs./ft.$^3$ to about 120 lbs./ft.$^3$.

5. The thermally insulating composite of claim 1 wherein the cementitious material is hydraulic cement.

6. The thermally insulating composite of claim 5 wherein the hydraulic cement is Portland cement.

7. The thermally insulating composite of claim 1 wherein the cementitious material is gypsum.

8. The thermally insulating composite of claim 1 wherein the cellular portion of the cementitious material contains air.

9. The thermally insulating composite of claim 1 wherein the cementitious material contains about 0.25 weight percent to about 7.0 weight percent fibrous material based upon the weight of the cementitious material.

10. The thermally insulating composite of claim 1 wherein the fibrous material is selected from the group consisting of glass fibers, cellulose fibers and mineral wool.

11. The thermally insulating composite of claim 1 comprising a plurality of structural surfaces of the cellular cementitious material containing fibrous material, the plurality of surfaces defining a core of low-density cellular cementitious material.

12. The thermally insulating composite of claim 1 further comprising a permeable enclosure element upon the higher density structural surface.

13. The thermally insulating composite of claim 12 wherein the permeable enclosure element is woven or non-woven fabric.

14. The thermally insulating composite of claim 12 wherein the permeable enclosure element has a pore size of less than 40 mesh to about 100 mesh.

* * * * *